United States Patent
Cong et al.

(10) Patent No.: US 9,785,422 B1
(45) Date of Patent: Oct. 10, 2017

(54) APPLYING MULTIPLE REWRITING WITHOUT COLLISION FOR SEMI-AUTOMATIC PROGRAM REWRITING SYSTEM

(71) Applicant: International Business Machines Corporation, Armonk, NY (US)

(72) Inventors: Guojing Cong, Ossining, NY (US); Hiroki Murata, Tokyo (JP); Yasushi Negishi, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/339,015

(22) Filed: Oct. 31, 2016

(51) Int. Cl.
  *G06F 9/44* (2006.01)
  *G06F 9/45* (2006.01)

(52) U.S. Cl.
  CPC .............. *G06F 8/4441* (2013.01); *G06F 8/33* (2013.01)

(58) Field of Classification Search
  None
  See application file for complete search history.

(56) References Cited

U.S. PATENT DOCUMENTS

| | | | |
|---|---|---|---|
| 6,526,403 B1 | 2/2003 | Lin et al. | |
| 6,598,221 B1 | 7/2003 | Pegatoquet et al. | |
| 6,865,735 B1 | 3/2005 | Sirer et al. | |
| 7,383,534 B1* | 6/2008 | Agbabian | G06F 8/71 717/108 |
| 2003/0110481 A1* | 6/2003 | Wada | G06F 8/4441 717/158 |
| 2007/0061783 A1* | 3/2007 | Prakash | G06F 9/505 717/127 |
| 2007/0061784 A1* | 3/2007 | Prakash | G06F 11/3433 717/127 |
| 2007/0061785 A1* | 3/2007 | Prakash | G06F 8/70 717/127 |
| 2009/0313612 A1 | 12/2009 | Vick et al. | |

(Continued)

OTHER PUBLICATIONS

Sozeau, "A New Look at Generalized Rewriting in Type Theory," Harvard University, cached 2009.*

(Continued)

*Primary Examiner* — Insun Kang
(74) *Attorney, Agent, or Firm* — Scully, Scott, Murphy & Presser, P.C.; Daniel P. Morris, Esq.

(57) ABSTRACT

A system and method for applying multiple rewritings without contention in a semi-automatic program rewriting system. The method includes: finding dependent ranges of a variable and a modification affecting range of the variable in a target program; determining at least two solutions for target program modification; detecting whether a collision condition exists amongst the one or more solutions; and modifying the program with said one or more solutions if no collision condition exists, while disabling the other solution if a collision condition is detected. A solution includes a rewriting of a segment of a target program code, and there is performed applying one or both of: multiple rewritings in a single solution and multiple rewritings in multiple regions of the target program. When multiple solutions are applied, the second and later solutions are applied to the already rewritten program. The correct application regions of the second and later solutions are identified.

21 Claims, 10 Drawing Sheets

(56) References Cited

U.S. PATENT DOCUMENTS

| | | | | |
|---|---|---|---|---|
| 2010/0180255 A1* | 7/2010 | Chung | .................... | G06F 8/443 717/110 |
| 2011/0258607 A1* | 10/2011 | Bhatt | .................. | G06F 11/3608 717/126 |
| 2014/0173574 A1* | 6/2014 | Schmidt | .................. | G06F 8/427 717/143 |
| 2014/0298307 A1* | 10/2014 | Johnson | .................. | G06F 8/443 717/158 |
| 2015/0113229 A1* | 4/2015 | Boettiger | ................ | G06F 9/528 711/145 |

OTHER PUBLICATIONS

Beyls et al., "Refactoring for Data Locality", IEEE Computer Society, vol. 42, No. 2, Feb. 2009, pp. 62-71.

Moreno, "Automatic Optimization of Multi-Paradigm Declarative Programs", Lecture Notes in Computer Science, Nov. 2002, Conference Advances in Artificial Intelligence—IBERAMIA 2002, 8th Ibero-American Conference on AI, Seville, Spain, Nov. 12-15, 2002, Proceedings.

Felber, "Semi-Automatic Parallelization of Java Applications", Chapter, On the Move to Meaningful Internet Systems 2003; CoopIS, DOA, and ODBASE, vol. 2888 of the series Lecture Notes in Computer Science, pp. 1369-1383 (2003).

Marin, "Semi-Automatic Synthesis of Parameterized Performance Models for Scientific Programs", Thesis, Rice University, Master of Science, Houston, TX, Apr. 2003.

Sozeau, "A New Look at Generalized Rewriting in Type Theory", Harvard University, TYPES'09, May 2009.

\* cited by examiner

300

Program 1

```
do j = jsta, jend
  do i = ista, iend
    u2 = v(i,j,1)**2 + v(i,j,2)**2
    p2 = p(i,j,1)**2 + p(i,j,2)**2
  enddo
enddo
```

Program 2

```
do j = jsta, jend, 4          ← 306
  do i = ista, iend
    u2 = u(i,j,1)**2 + u(i,j,2)**2       ⎫
    p2 = p(i,j,1)**2 + p(i,j,2)**2       ⎬ 302
    u2 = u(i,j+1,1)**2 + u(i,j+1,2)**2   ⎫
    p2 = p(i,j+1,1)**2 + p(i,j+1,2)**2   ⎪
    u2 = u(i,j+2,1)**2 + u(i,j+2,2)**2   ⎬ 304
    p2 = p(i,j+2,1)**2 + p(i,j+2,2)**2   ⎪
    u2 = u(i,j+3,1)**2 + u(i,j+3,2)**2   ⎪
    p2 = p(i,j+3,1)**2 + p(i,j+3,2)**2   ⎭
  enddo
enddo
```

FIG. 9

APPLYING MULTIPLE REWRITING WITHOUT COLLISION FOR SEMI-AUTOMATIC PROGRAM REWRITING SYSTEM

STATEMENT REGARDING FEDERALLY SPONSORED RESEARCH OR DEVELOPMENT

This invention was made with Government support under Contract No.: HR0011-07-9-0002 awarded by Defense Advanced Research Projects Agency (DARPA). The Government has certain rights in this invention.

FIELD

The present application relates generally to code and program optimization, e.g., and more particularly, to techniques for semi-automatic rewriting of programs to optimize their performance.

BACKGROUND

In the art, there exists systems and compilers that provide a semi-automated "solution" to "re-write" a portion(s) of the program to optimize its performance.

While one existing complier system provides an auto tuning system that detects an optimizable part of the target program based on the performance data and the static analysis of the program, it does not handle multiple optimizations overlapping one another in the target program, because it extracts the optimizable part as a subroutine in a dynamically loadable library, and optimizes the subroutine.

Current program optimization solutions for high performance applications do not detect multiple performance bottlenecks and do not apply the corresponding solutions in a single run of this system. In the case of multiple solutions found, their application regions may collide, and there may also be dependency between solutions for several bottlenecks. However simple exclusion of colliding solutions and dependent solutions decreases the number of solutions applied in one run of the system.

That is, current program optimization systems do not provide a necessary and sufficient collision detection mechanism among re-write solutions.

Further, current systems do not indicate specific locations to apply multiple solutions.

Further, the current systems do not apply multiple rewritings in a single solution.

SUMMARY

A system, method and computer program product for analyzing dependencies and detecting collision among solutions and present those to the user necessarily and sufficiently to increase the number of solutions applied in one program re-write optimization run.

A system, method and computer program product for applying multiple solutions are applied to a program wherein second and later re-write solutions are applied to the already rewritten program. As the application regions of the solutions may change, the method includes identifying correct application regions of the second and later solutions. That is, when multiple rewritings are included in a solution, a rewriting may be applied to the result of the previous rewritings. Each rewriting is able to specify the result of the previous rewritings.

In one aspect, there is provided a computer-implemented method for determining one or more solutions to optimize a target program, the program having at least one variable. The method comprises: finding, using a hardware processor, dependent ranges of a variable and a modification affecting range of the variable in the target program; determining, using the hardware processor, at least two solutions for target program modification; detecting, using the hardware processor, whether a collision condition exists amongst the one or more solutions; and modifying, using the hardware processor, the program with the one or more solutions if no collision condition exists, while disabling the other solution if a collision condition is detected.

In a further aspect, there is provided an apparatus for determining one or more solutions to optimize a target program, the target program having at least one variable. The apparatus comprises a processor and a non-transitory computer-readable memory coupled to the processor, wherein the memory comprises instructions which, when executed by the processor, cause the processor to: find dependent ranges of a variable and a modification affecting range of the variable in the target program; determine at least two solutions for target program modification; detect whether a collision condition exists amongst the one or more solutions; and modify the program with the one or more solutions if no collision condition exists, while disabling the other solution if a collision condition is detected.

In a further aspect, there is provided a computer program product for performing operations to determine one or more solutions to optimize a target program. The computer program product includes a storage medium readable by a processing circuit and storing instructions run by the processing circuit for running a method. The method is the same as listed above.

BRIEF DESCRIPTION OF THE SEVERAL VIEWS OF THE DRAWINGS

The foregoing aspects and other features are explained in the following description, taken in connection with the accompanying drawings, wherein:

FIG. 9 illustrates an example implementation and effect of using the present methods for applying multiple rewritings in single solution.

DETAILED DESCRIPTION

A system and method for compiling and executing a target program, collect its performance data, analyze it statically, present its performance bottlenecks and the solutions for the bottlenecks derived from the performance data and static analysis, and then optimize the program by applying the solutions including auto-rewriting based on the user selection of the solutions.

Figure 1:
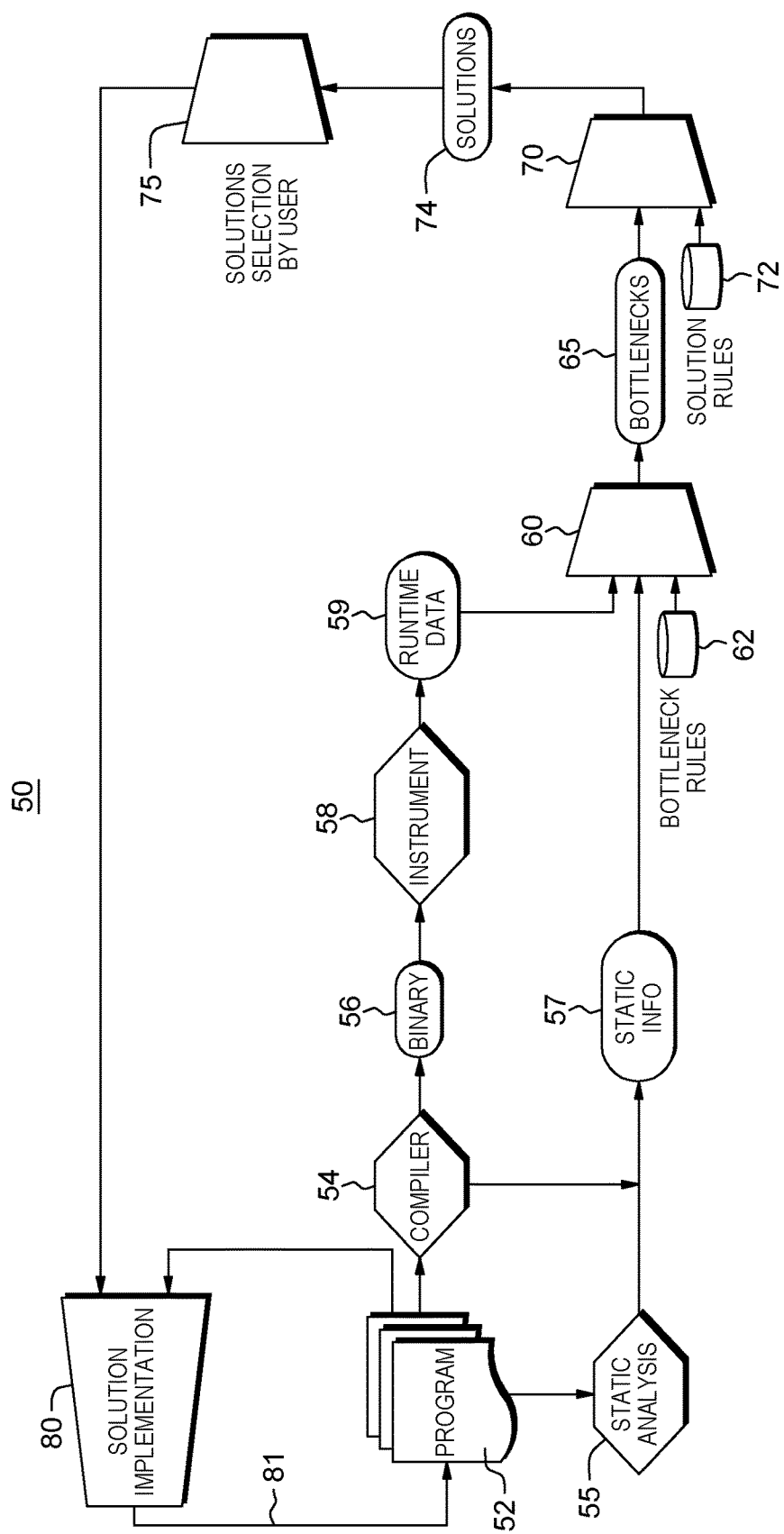
FIG. 1 depicts an embodiment of a semi-automatic optimization system according to one embodiment.

FIG. 1 shows a semi-automatic program optimization system 50 implementing the methods herein according to one embodiment. In the embodiment depicted, a target program 52 is input to the system 50 for analysis. The program is compiled (e.g., using a compiler) at 54 and is also subject to a static analysis using a static analysis tool 55. The compiler generates a compiled binary program code output 56 and from the static analysis tool 55 there is generated further static analysis information 57 as a result of static analysis conducted. The binary code output 56 is further instrumented at 58 with additional code and is subject to running on a computer system for performance analyzation—particularly to detect execution bottlenecks. In this regard, runtime data 59 produced from the instrumented compiled binary program is processed at a bottleneck detection logic block 60 in conjunction with received static analysis information 57 received from the static analysis tool and in accordance with the application of bottleneck rules 62 to detect instances of performance bottlenecks. Based on the data 59, static analysis information 57 and rules 62, bottleneck detection logic block 60 applies logic for detecting bottlenecks 65.

Then, as further shown in FIG. 1, the computer system implements a solution discovery block 70 implementing logic to apply solution discovery rules 72 to discern the one or multiple bottlenecks and obtain solutions that address the one or multiple bottlenecks 65. The one or multiple solutions 74 in particular are output in a manner such that the user, via an interface, may select one or more particular solutions 75. In one embodiment, the one or multiple solutions 74 are stored in a memory storage device associated with the computer system, which is input back to a solution implementation logic block 80 to modify, i.e., specify how to re-write the original program 52 at 80 with the particular solution 81 found to address the corresponding bottleneck.

Figure 2:
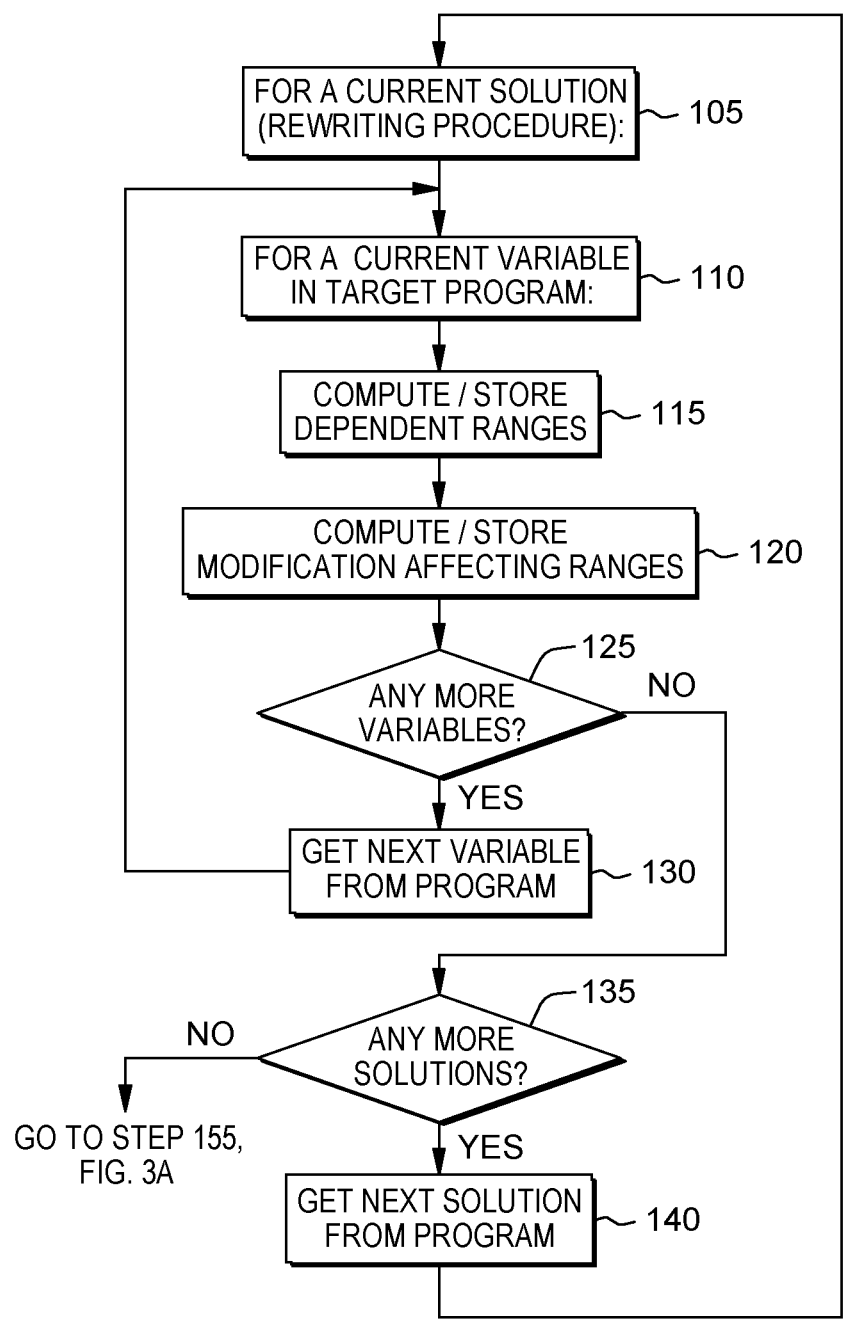
FIG. 2 illustrates one embodiment for implementing a method for detecting a collision among the rewritings in multiple regions of the target program (solutions)

FIG. 2 illustrates one embodiment of a method 100 for detecting a collision among the rewritings (solutions) in multiple regions of the target program. In one embodiment, to detect collisions among solutions includes, for a current solution (rewriting procedure) at 105, and for a current variable obtained at 110, there is performed calculating a first set of dependent ranges of that current variable and storing the same at 115. At 120, the system further calculates a second set of modification affecting ranges. The dependent ranges include a list of variables the solution depends. In one embodiment, each variable has a range that starts from the location where the value of the variable is set, and ends at the location where the solution refers the variable. The dependent ranges including the list of variables the solution depends upon is stored in a memory storage device, e.g., associated with a computer system. The modification affecting ranges are the list of variables the solution affects. Each variable has the range rewritten and affected by the solution. The modification affecting ranges including the list of variables the solution depends upon is stored in the memory storage device, e.g., associated with the computer system. The solution provides them to the system.

At 125, it is determined whether all of the variables for the rewrite have been used. If not all variables from the program are used, the next variable from the program is obtained at 130 and the process proceeds back to step 110 to repeat steps 110-125 for the current solution. If all variables from the program have been processed, then the process proceeds back to 135 where it is determined whether there is another solution (rewriting procedure) to evaluate a set of dependent ranges and a set of modification affecting ranges for a collision. If there is a further, e.g., a second or more, solution for which dependent and modification affecting ranges are determined, then the process proceeds to step 140 to obtain the next solution (rewriting procedure) and the process returns to step 105 where steps 105-135 are repeated until no more solutions are determined. Otherwise, returning to step 135, if it is determined that there is no further solution for which dependent and modification affecting ranges are to be determined, the process proceeds to step 150, FIG. 3A to determine if there is a collision of one or more of the solutions.

Figure 3A:
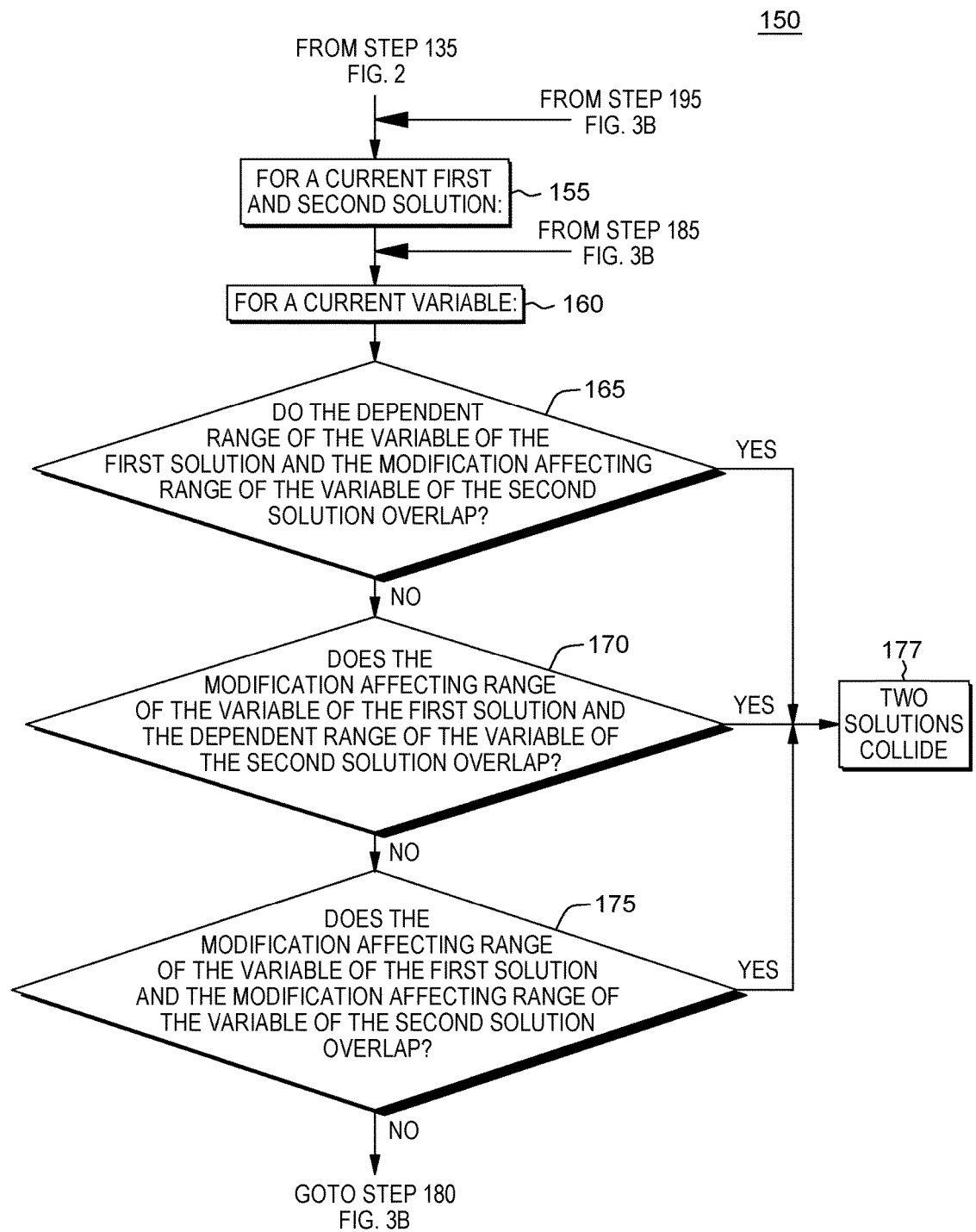
FIGS. 3A-3B illustrate one embodiment for implementing a method for detecting a collision between two solutions.
Figure 3B:
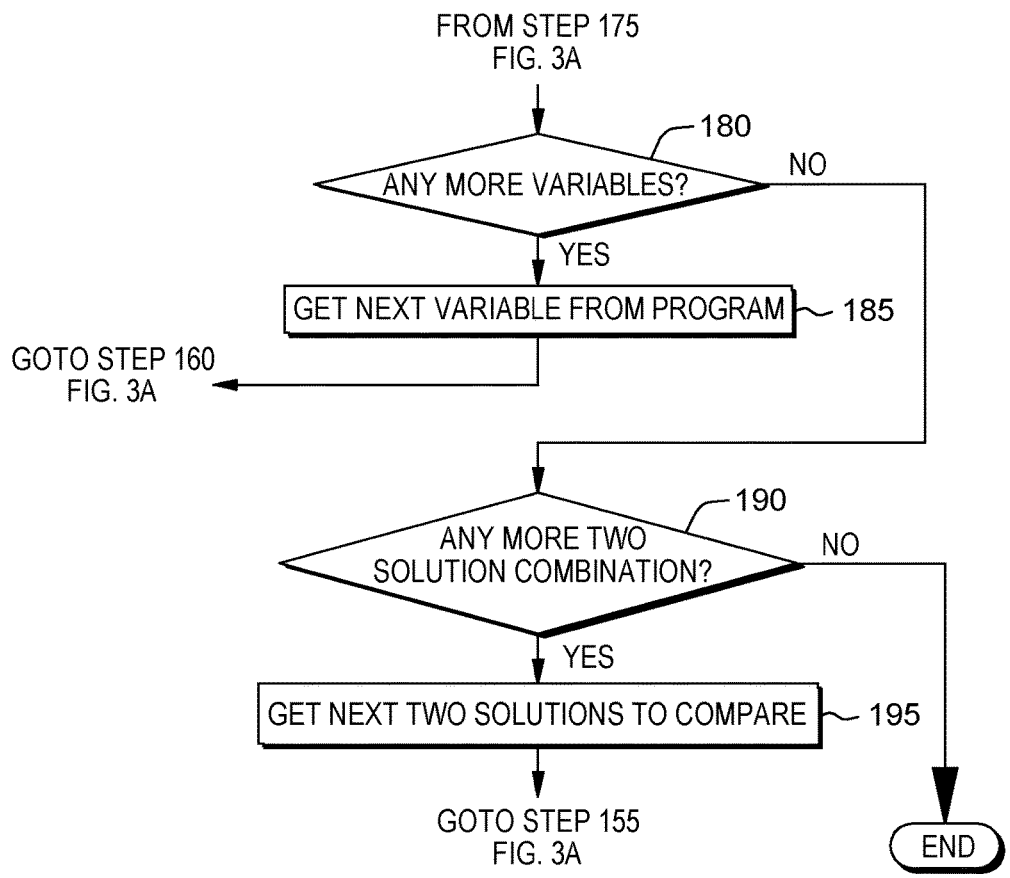

FIGS. 3A and 3B depict implementations of a method 150 to detect a collision between two solutions.

In FIG. 3A, at 155, the system implements methods to evaluate and detect a collision between two solutions. At 155, for a current first and second solution being evaluated, and for a first variable obtained at 160, the method first determines at 165 whether the dependent range of the variable of the first solution and the modification affecting range of the variable of the second solution are overlapped. If it is determined that the dependent range of the variable of the first solution and the modification affecting range of the variable of the second solution are overlapped, then the two solutions are determined to collide at 177. Otherwise, if at 165 it is determined that the dependent range of the variable of the first solution and the modification affecting range of the variable of the second solution are not overlapped, or in a completely independent parallel running path, the process proceeds to 170 to determine whether the modification affecting range of a variable of the first solution and the dependent range of the variable of the second solution are overlapped. If it is determined that the modification affecting range of a variable of the first solution and the dependent range of the variable of the second solution are overlapped, then it is determined at 177 that the two solutions collide. Otherwise, at 170, if it is determined that the modification affecting range of a variable of the first solution and the dependent range of the variable of the second solution are not overlapped, the process proceeds to step 175 to determine whether the modification affecting range of a variable of the first solution and the modification affecting range of the variable of the second solution are overlapped. If at 175, it is determined that the modification affecting range of a variable of the first solution and the modification affecting range of the variable of the second solution are overlapped, then the two solutions collide as determined at 177. Otherwise, if it is determined at 175 that the modification affecting range of a variable of the first solution and the modification affecting range of the variable of the second solution are not overlapped, then the system repeats the procedure 150 for all the variables of the two solutions by proceeding to 180, FIG. 3B by first determining at 180, FIG. 3B whether all of the variables for the rewrite have been used. If not all variables from the program are used, the next variable from the program is obtained at 185 and the process proceeds back to step 160, FIG. 3A to repeat steps 160-180 for the first (or next solution) until there are no more variables for that current solution.

If all variables from the program have been processed at 180, then the process proceeds to 190 where a determination is made as to whether all combinations of two solutions have been evaluated to ensure no collisions amongst them. If at 190 it is determined whether there is another solution (e.g., a next rewriting procedure) that is to be compared, then the process obtains the next combination of two solutions at 195 and the process returns to 155, FIG. 3A, and steps 155-190 are repeated until no more combinations of two solutions are determined for collision detection in which the solution collision detecting ends.

Figure 4:
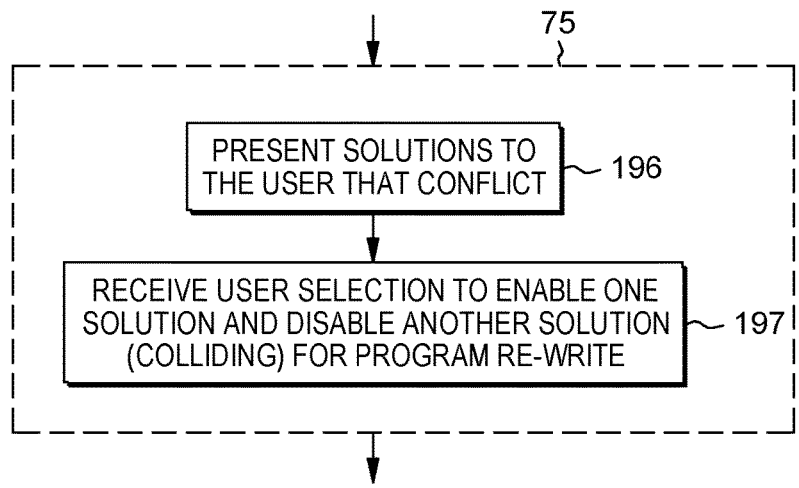
FIG. 4 depicts more detailed steps of configuring the computer system to present solutions to the user for selection in view of any detected solution collision(s)

Referring to FIG. 4, there is depicted an embodiment of step 75 of FIG. 1 which includes more detailed steps of configuring the computer system at 196 to present solutions to the user by considering any detected collision where, for example, at 197 if two solutions are determined to collide, the user may select to enable one solution while the other solution is disabled.

Figure 5:
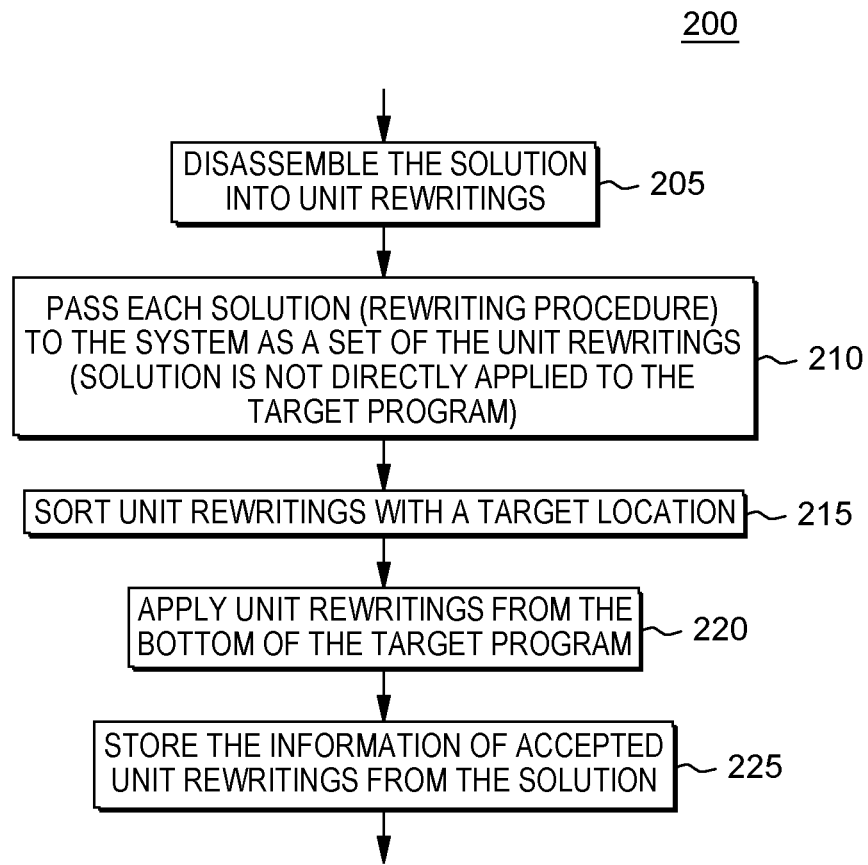
FIG. 5 depicts a more detailed embodiment of a method to specify target program locations where multiple solutions can be applied.

Referring to FIG. 5, there is depicted a more detailed embodiment of a method 200 to specify program locations where multiple solutions can be applied. When multiple solutions are applied to the program, the second and later solutions are applied to the already rewritten program. As the application regions of the solutions may change, the method includes identifying correct application regions of the second and later solutions. Thus, to specify locations to apply multiple solutions, FIG. 5 shows a first step 205 for disassembling the solution into unit rewritings. For example, a unit writing may include, but are not limited to: a replacement, an insertion, and a deletion of continuous characters, each represented as a set of unit rewritings. For a larger contiguous region: a line or plural lines are usable as the continuous characters of a unit rewrite.

Then at 210, each solution (rewriting procedure) is not directly applied to the target program, but is passed to the system as a set of the unit rewritings. Then, at 215 the system sorts unit rewritings with a target location. Then at 220, the system applies unit rewritings from a predetermined location, e.g., from the bottom of the target program. These procedures configure the system to avoid misalignment of locations caused by applying the unit rewritings to the program. That is, when unit rewritings are applied from the top of the target program, the locations of statements and variables are changed in the part of the target program after a unit rewriting is applied, e.g., the target locations of unit rewritings in the part of the target program after a unit rewriting is applied are changed (misaligned or lost). At 225, there is further performed storing the information of accepted unit rewritings from the solution. The system holds the information of accepted unit rewritings coming from each solution.

In one embodiment, a unit rewriting includes a target location where it is applied in the target program. The target location is represented with a set of start line, start column, end line, and end column of the target program. In one embodiment, unit rewritings are sorted with the set of start line, start column, end line, and end column.

Figure 6:
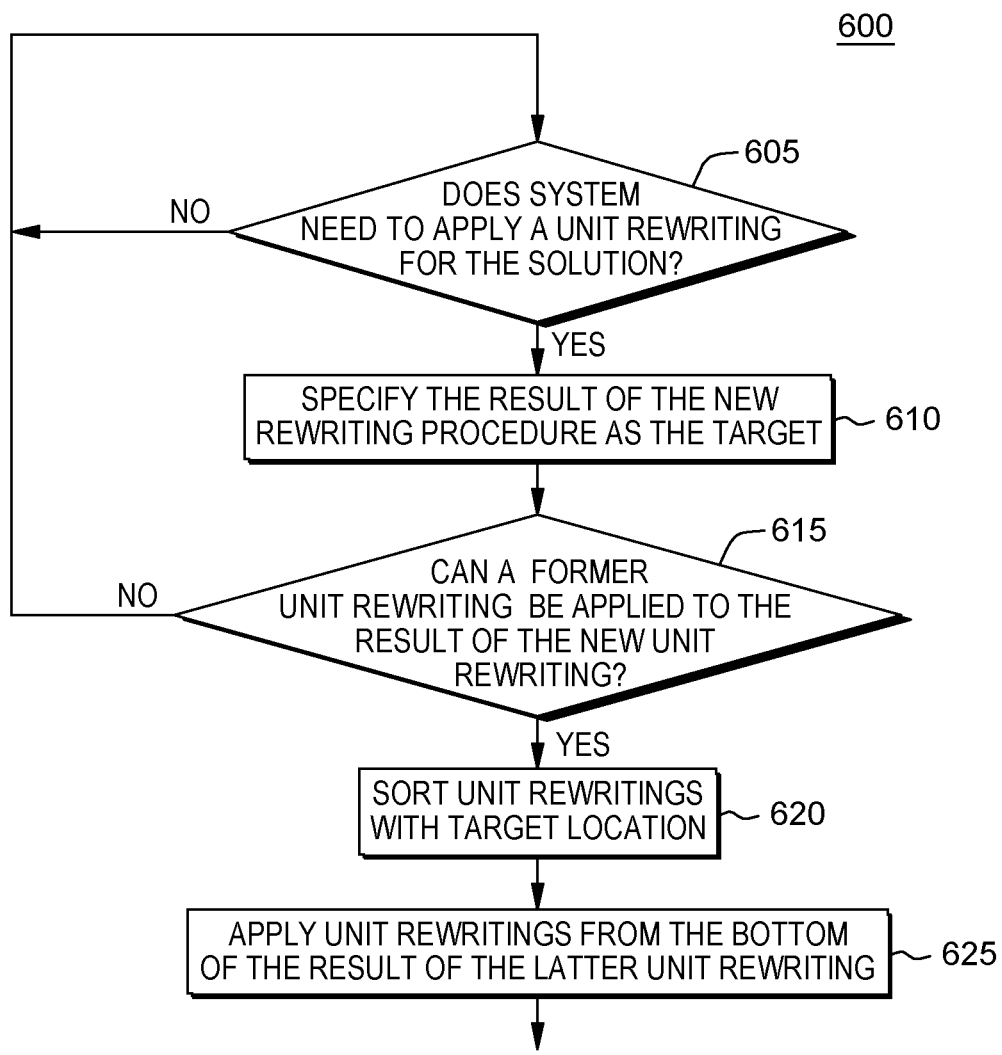
FIG. 6 depicts a method implemented for applying multiple rewritings in single solution.

In a further embodiment, as depicted in FIG. 6, a method 600 is implemented that further includes applying multiple rewritings in single solution. That is, the method applies unit rewritings on the result of another unit rewriting in a solution and consequently the system keeps track of the information of which unit rewritings comes from a solution. The system holds the information of accepted unit rewritings coming from the original program. That is, at 605, it is first determined whether the solution needs to apply unit rewritings on the result of the system receiving a unit rewriting. At 605, when the solution needs to apply unit rewritings on a result of a rewriting passed to the system, the method specifies the result of the rewriting as a target at 610. In this embodiment, former unit rewritings specify the result of the latter unit rewriting as the target. For example, as the former unit rewritings may be generated as standard unit rewritings, those target locations are now set with the original locations of the result of the latter unit rewriting in the original program. Then, the system checks at 615 whether the former unit rewritings can be applied to the result of the latter unit rewriting. If the former unit rewritings can be applied to the result of the latter unit rewriting, then at 620 the system sorts former unit rewritings with those target locations, and at 625 applies unit rewritings from the bottom of the result of the latter unit rewriting.

Figure 7:
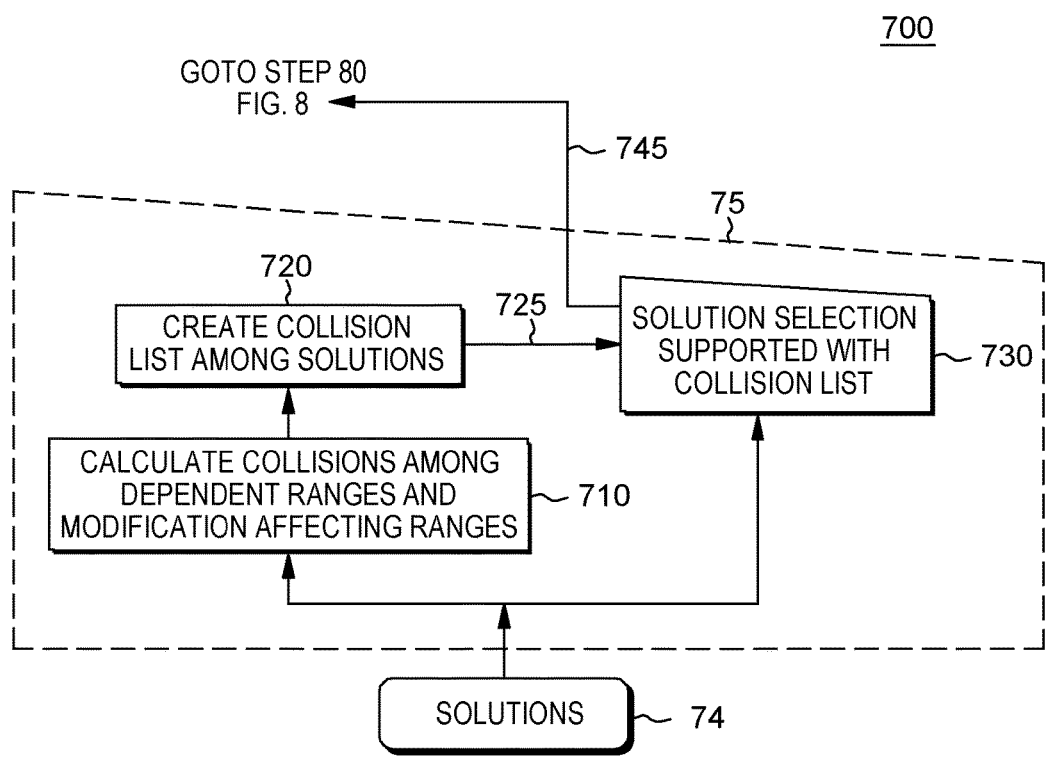
FIG. 7 is a system depicting operations for selecting solutions in the re-writing system according to an embodiment.

FIG. 7 is a system 700 depicting operations for selecting solutions in the re-writing system according to an embodiment. This implementation automates the software selection of solutions step 75 in the optimization system of FIG. 1. As shown, the one or multiple solutions 74 are stored in a memory storage device and are input to the system. Processing block 710 represents processing of two input solutions 76 for calculating collisions among dependent ranges and modification affecting ranges such as described in connection with FIG. 3A. This processing block may include steps of calculating rewrite region and a reference region. Then, processing at 720 is to generate a list 725 of all the detected collisions among the solutions. At 730, the solution(s) are selected with additional support of the colliding solutions listed in the collision list 725 generated. The solution(s) 745 are output application to the target program for processing at the solution implementation processing block 800 of FIG. 8.

Figure 8:
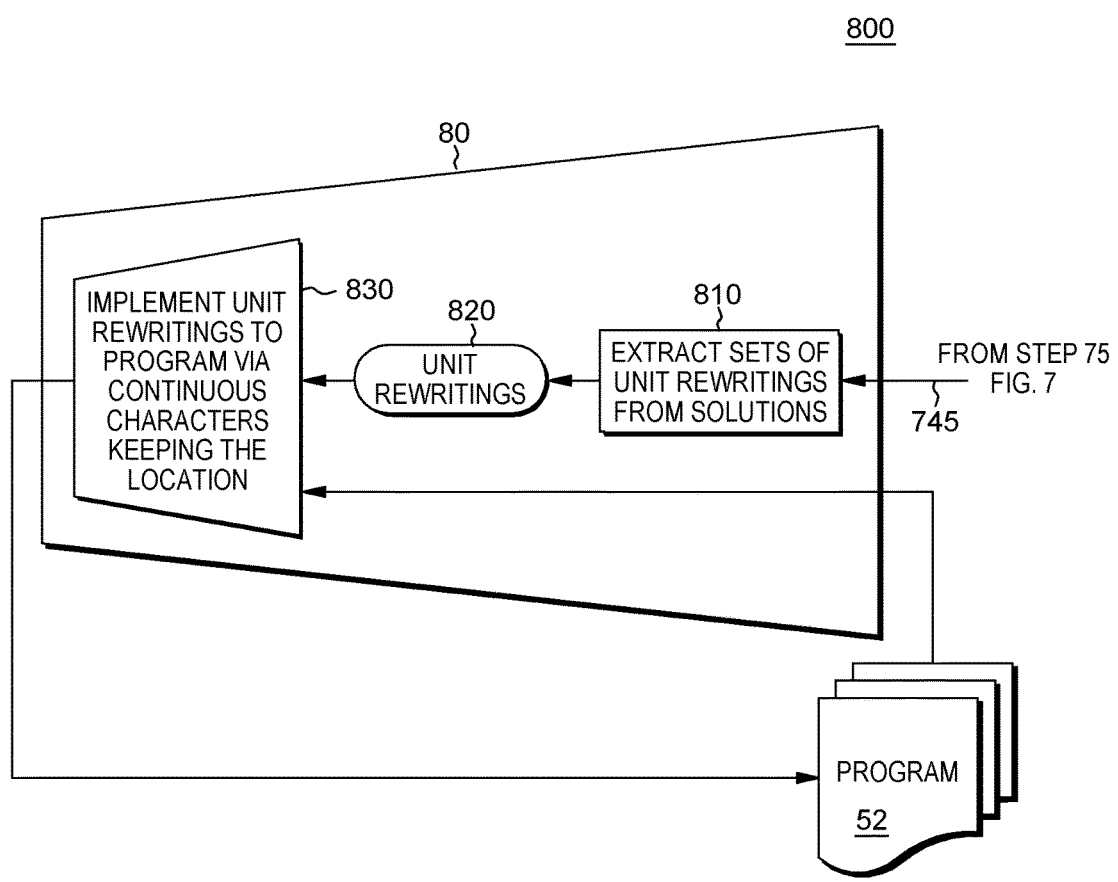
FIG. 8 shows a system implementation of the selected solution for optimizing a target program.

FIG. 8 shows a detailed system implementation 800 corresponding to solution implementation logic block 80 of FIG. 1 for optimizing the target program 52 using the selected solution 745 selected at FIG. 7. As shown at 810, the extracting of sets of unit rewritings from solutions 745 selected from block 75. Then, at 820 there is performed a unit rewriting at the target location(s). Then, at 830, there is performed the implementing of unit rewritings to the target program 52 via continuous characters keeping the location, i.e., a part of the target program keeping the location information in the target program, or the result of a latter unit rewriting keeping the location information in the (rewritten) target program.

An implementation and effect is now described in the form of an example of collision detection and resolution for the following program that considers two loops, L1 and L2, in a subroutine method call "a" as follows:

subroutine a(ista, iend, jsta, jend)
L1: do j=jsta, jend
   do i=ista, iend
     e(i,j)=eq(i−1,j)+eq(i+1,j)+eq(i,j−1)+eq(i,j+1)
   enddo
 enddo
L2: do j=jsta, jend
   do i=ista, iend
     f(i,j)=w1*fq(i−1,j)+w2*fq(i+1,j)+w3*fq(i,j−1)+w4*fq(i,j+1)
   enddo
 enddo
end When two solutions are applied to L1 and the modification affecting ranges of variables of each solution overlap, they are not applicable at once (the two solutions collide as determined at FIG. 3A, step 175). When one solution is applied to L1 and another solution is applied to L2 and both solutions depends on passed through variables ista, iend, jsta, and jend, the dependent areas of variables of solutions expand to the subroutine statement. If the modification affecting ranges of the variables, ista, iend, jsta, and jend, of the solution applied to L1 is a part of L1, the modification affecting range of the variable of the solution to L1 and the dependent range of the variable of the solution to L2 overlap, and they are not applicable at once (the solutions collide at FIG. 3A 165 or 170).

In this example, if each solution's modification affecting ranges of the variables, ista, iend, jsta, and jend, do not overlap with another solution's dependent ranges of the variables, both solutions are applicable in one optimization loop.

An implementation and effect is now described in the form of a further example of applying multiple rewritings in single solution as shown in FIG. 9. In this example 300 of FIG. 9 there is depicted a rewriting from a first program (Program 1) to a second program (Program 2). In particular, the modification from Program 1 to Program 2 in the example 300 is an outer loop unrolling. This modification consists of a sequence of operations: loop body copy 302, replace j, insert modified body 304 after the original body 302, and insert step 306 in line 1. With the solution being constructed with unit rewritings: copy, replacement, insertion, and deletion of continuous characters only, the unit rewritings performed at 800, FIG. 8 are as follows:
insert ", 4" after line 1 column 20
copy "u2=v(i," and insert before line 5
insert "j+1" before line 5
copy ",1)**2+v(i," and insert before line 5
insert "j+1" before line 5
copy ",2)**2" and insert before line 5
copy "p2=p(i," and insert before line 5
insert "j+1" before line 5
copy ",1)**2+p(i," and insert before line 5
insert "j+1" before line 5
copy ",2)++2" and insert before line 5
copy "u2=v(i," and insert before line 5
insert "j+2" before line 5
copy ",1)**2+v(i," and insert before line 5
insert "j+2" before line 5
copy ",2)**2" and insert before line 5
copy "p2=p(i," and insert before line 5
insert "j+2" before line 5
copy ",1)**2+p(i," and insert before line 5
insert "j+2" before line 5
copy ",2)++2" and insert before line 5
copy "u2=v(i," and insert before line 5
insert "j+3" before line 5
copy ",1)**2+v(i," and insert before line 5
insert "j+3" before line 5
copy ",2)**2" and insert before line 5
copy "p2=p(i," and insert before line 5
insert "j+3" before line 5
copy ",1)**2+p(i," and insert before line 5
insert "j+3" before line 5
copy ",2)++2" and insert before line 5

In one embodiment, these unit rewritings are correctly applied to the source code of a target program 52 with "Location specification to apply multiple solutions".

In a further embodiment, the system provides ability of "applying multiple rewritings in single solution". In the case of the Example of FIG. 9, the above unit rewritings becomes as follows:
insert ", 4" after line 1 column 20
copy body of loop(line 2-line 5) to A
insert A after line 4
change "j" to "j+1" at line 3 column 22 in A
change "j" to "j+1" at line 3 column 36 in A
change "j" to "j+1" at line 4 column 22 in A
change "j" to "j+1" at line 4 column 36 in A
copy body of loop(line 2-line 5) to B
insert B after A
change "j" to "j+2" at line 3 column 22 in B
change "j" to "j+2" at line 3 column 36 in B
change "j" to "j+2" at line 4 column 22 in B
change "j" to "j+2" at line 4 column 36 in B
copy body of loop(line 2-line 5) to C
insert C after B
change "j" to "j+3" at line 3 column 22 in C
change "j" to "j+3" at line 3 column 36 in C
change "j" to "j+3" at line 4 column 22 in C
change "j" to "j+3" at line 4 column 36 in C In this example, A, B, and C are not simple continuous characters but keeping source code locations. Those keep the location in the source code, so another unit rewriting can be applied to those.

Further to this example, the system sorts the unit rewritings as follows:
copy body of loop(line 2-line 5) to C
change "j" to "j+3" at line 4 column 36 in C
change "j" to "j+3" at line 4 column 22 in C
change "j" to "j+3" at line 3 column 36 in C
change "j" to "j+3" at line 3 column 22 in C
insert C after line 4
copy body of loop(line 2-line 5) to B
change "j" to "j+2" at line 4 column 36 in B
change "j" to "j+2" at line 4 column 22 in B
change "j" to "j+2" at line 3 column 36 in B
change "j" to "j+2" at line 3 column 22 in B
insert B after line 4
copy body of loop(line 2-line 5) to A
change "j" to "j+1" at line 4 column 36 in A
change "j" to "j+1" at line 4 column 22 in A
change "j" to "j+1" at line 3 column 36 in A
change "j" to "j+1" at line 3 column 22 in A
insert A after line 4
insert ", 4" after jend in line 1

The system then applies the unit rewritings to the source code in bottom to top order as follows:
copy body of loop(line 2-line 5) to C
  Contents of C becomes as follows:
  3 u2=v(i,j,1)2+v(i,j,2)2
  4 p2=p(i,j,1)2+p(i,j,2)2
change "j" to "j+3" at line 4 column 36 in C
change "j" to "j+3" at line 4 column 22 in C
change "j" to "j+3" at line 3 column 36 in C
change "j" to "j+3" at line 3 column 22 in C
  Contents of C becomes as follows:
  3 u2=v(i,j+3,1)2+v(i,j+3,2)2
  4 p2=p(i,j+3,1)2+p(i,j+3,2)2
insert C after line 4
  Source code becomes as follows:
  1 do j=jsta, jend
  2 do i=ista, iend
  3 u2=v(i,j,1)2+v(i,j,2)2
  4 p2=p(i,j,1)2+p(i,j,2)2

```
5 u2=v(i,j+3,1)**2+v(i,j+3,2)**2
6 p2=p(i,j+3,1)**2+p(i,j+3,2)**2
7 enddo
8 enddo
copy body of loop(line 2-line 5) to B
change "j" to "j+2" at line 4 column 36 in B
change "j" to "j+2" at line 4 column 22 in B
change "j" to "j+2" at line 3 column 36 in B
change "j" to "j+2" at line 3 column 22 in B
insert B after line 4
    Source code becomes as follows:
    1 do j=jsta, jend
    2 do i=ista, iend
    3 u2=v(i,j,1)2+v(i,j,2)2
    4 p2=p(i,j,1)2+p(i,j,2)2
    5 u2=v(i,j+2,1)**2+v(i,j+2,2)**2
    6 p2=p(i,j+2,1)**2+p(i,j+2,2)**2
    7 u2=v(i,j+3,1)**2+v(i,j+3,2)**2
    8 p2=p(i,j+3,1)**2+p(i,j+3,2)**2
    9 enddo
    10 enddo
copy body of loop(line 2-line 5) to A
change "j" to "j+1" at line 4 column 36 in A
change "j" to "j+1" at line 4 column 22 in A
change "j" to "j+1" at line 3 column 36 in A
change "j" to "j+1" at line 3 column 22 in A
insert A after line 4
insert ", 4" after jend in line 1
    Source code becomes as follows:
    1 do j=jsta, jend, 4
    2 do i=ista, iend
    3 u2=v(i,j,1)2+v(i,j,2)2
    4 p2=p(i,j,1)2+p(i,j,2)2
    5 u2=v(i,j+1,1)**2+v(i,j+1,2)**2
    6 p2=p(i,j+1,1)**2+p(i,j+1,2)**2
    7 u2=v(i,j+2,1)**2+v(i,j+2,2)**2
    8 p2=p(i,j+2,1)**2+p(i,j+2,2)**2
    9 u2=v(i,j+3,1)**2+v(i,j+3,2)**2
    10 p2=p(i,j+3,1)**2+p(i,j+3,2)**2
    11 enddo
    12 enddo
```

Thus, in one embodiment, when the copy keeps the location in the source code as in locations A, B, and C, solutions for the source code can be applied to the copy, because the source code is a special copy having the location starting line 1 and ending at the end line.

If there is a solution (for example, e-change) rewriting a variable to another string in an area, the solution for "applying multiple rewritings in single solution" may be modified as follows:

```
insert ", 4" after line 1 column 20
copy body of loop(line 2-line 5) to A
insert A after line 4
e_change j to "j+1" in A
copy body of loop(line 2-line 5) to B
insert B after A
e_change j to "j+2" in B
copy body of loop(line 2-line 5) to C
insert C after B
e_change j to "j+3" in C
```

Figure 10:
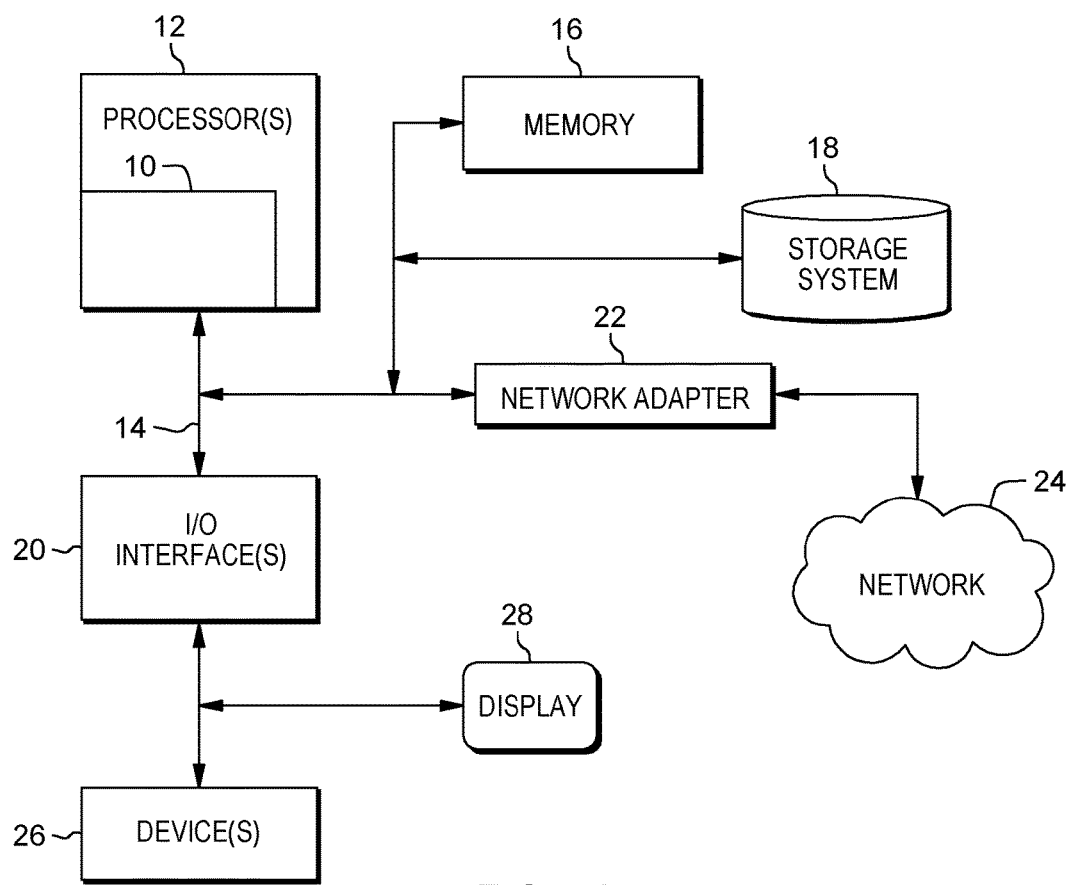
FIG. 10 is a hardware block diagram of an exemplary computer or processing system that may implement the methods of FIGS. 1-8 of the present disclosure.

FIG. 10 illustrates a schematic of an example computer or processing system that may implement the method to apply the program optimization in the embodiments of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 1 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the program optimization and program re-write/solution implementation process flow according to the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for optimizing a target program having original code, the target program having at least one variable, the method comprising:
    compiling the target program;
    determining, using a hardware processor, at least two solutions for target program modification of the compiled target program, said at least two solutions comprising a first solution and a second solution;
    for each of the first solution and the second solution for said target program modification, finding, using said hardware processor, dependent ranges of a variable and a modification affecting range of the variable in the target program;
    detecting, using said hardware processor, whether a collision condition exists amongst the at least two solutions, said collision condition being a detected overlap of dependent ranges of the variable and a modification affecting range of the variable of the first solution and the second solution; and
    modifying, using the hardware processor, the target program with said at least two solutions if no collision condition exists, or disabling one of said first solution or said second solution if a collision condition is detected and modifying the target program with a remaining one of said first or second solution.

2. The method of claim 1, wherein said modifying the target program with said at least two solutions comprises a rewriting of a segment of a target program code, said method further comprising one or both of:
    applying multiple rewritings in a single solution; and
    applying multiple rewritings in multiple regions of the target program.

3. The method of claim 2, wherein multiple rewritings are included in a single solution,
    applying a rewriting to a result of a previous rewriting, and
    at each rewriting, specifying the result of the previous rewriting.

4. The method of claim 1, wherein said detecting whether a collision condition exists amongst the at least two solutions comprises:
    obtaining the first solution and the second solution for a program rewrite, and for each variable of said first and second solutions obtained, determining whether a dependent range of the variable of the first solution of the at least two solutions overlaps with the modification affecting range of the variable of the second solution of the at least two solutions.

5. The method of claim 1, wherein said detecting whether a collision condition exists amongst the at least two solutions comprises:
    obtaining the first solution and the second solution of the at least two solutions, and for each variable of said first and second solutions obtained, determining whether the modification affecting range of a variable of the first solution and a dependent range of the variable of the second solution are overlapped.

6. The method of claim 1, wherein said detecting whether a collision condition exists amongst the at least two solutions comprises:
    obtaining the first solution and the second solution for program rewrite, and for each variable of said first and said second solutions of the at least two solutions obtained, determining whether the modification affecting range of a variable of the first solution and the modification affecting range of the variable of the second solution are overlapped.

7. The method of claim 1, further comprising:
    disassembling a solution of the at least two solutions into unit rewritings; and
    passing a unit rewriting procedure of each solution of the at least two solutions to the hardware processor for applying said at least two solutions as a set of the unit rewritings, wherein, a solution is not directly applied to the target program.

8. The method of claim 7, wherein the unit rewriting procedure comprises one or more selected from the group consisting of: copying code body or loop body, replacing one or more characters of lines of code, insertion of code, insert a line in the code, inserting a modified body after an original body, and deleting of one or more continuous characters, said method further comprising:
    storing copied code into a buffer with a location information of the original code;
    applying unit rewritings from a solution of the at least two solutions;
    and inserting the code in a buffer after a body of said original code.

9. The method of claim 3, wherein multiple solutions are applied to the program, said method comprising:

identifying correct application regions of the second solution and later solutions to be applied; and applying the second solution and later solutions to an already rewritten program.

10. An apparatus for determining optimizing a target program having original code, the target program having at least one variable, the apparatus comprising a processor and a non-transitory computer-readable memory coupled to the processor, wherein the memory comprises instructions which, when executed by the processor, cause the processor to:

compile the target program;

determine at least two solutions for target program modification of the compiled target program, said at least two solutions comprising a first solution and a second solution;

for each of the first solution and the second solution for said target program modification, find dependent ranges of a variable and a modification affecting range of the variable in the target program;

detect whether a collision condition exists amongst the at least two solutions, said collision condition being a detected overlap of dependent ranges of the variable and the modification affecting range of the variable of the first solution and the second solution of said at least two solutions; and modify the target program with said at least two solutions if no collision condition exists, or disabling one of said first solution or said second solution if a collision condition is detected and modifying the target program with a remaining one of said first or second solution.

11. The apparatus of claim 10 wherein said modifying the target program with said at least two solutions comprises a rewriting of a segment of the target program code, said processor is further configured to one or both of:

apply multiple rewritings in a single solution; and apply multiple rewritings in multiple regions of the target program.

12. The apparatus of claim 11, wherein multiple rewritings are included in a single solution, said processor is further configured to one or both of:

apply a rewriting to a result of a previous rewriting, and at each rewriting, specify the result of the previous rewriting.

13. The apparatus of claim 10, wherein said processor is further configured to:

disassemble a solution of the at least two solutions into unit rewritings; and receive a unit rewriting procedure of each solution for applying said at least two solutions as a set of the unit rewritings, wherein, a solution is not directly applied to the target program.

14. The apparatus of claim 13, wherein the unit rewriting procedure comprises one or more selected from the group consisting of: copying code body or loop body, replacing one or more characters of lines of code, insertion of code, insert a line in the code, inserting a modified body after an original body, and deleting of one or more continuous characters, said processor being further configured to:

store copied code into a buffer with a location information of the original code;

apply unit rewritings from a solution of the at least two solutions; and insert the code in a buffer after the original body.

15. The apparatus of claim 12, wherein multiple solutions are applied to the target program, said processor being further configured to:

identify correct application regions of the second and later solutions to be applied; and apply the second solution and later solutions to an already rewritten program.

16. A computer program product for optimizing a target program, the target program having at least one variable, the computer program product comprising a non-transitory computer-readable storage medium having a computer-readable program stored therein, wherein the computer-readable program, when executed on a computer system comprising at least one processor, causes the at least one processor to perform:

compiling the target program;

determining at least two solutions for target program modification of the compiled target program, said at least two solutions comprising a first solution and a second solution;

for each of the first solution and the second solution of said target program modification, finding dependent ranges of a variable and a modification affecting range of the variable in the target program;

detecting whether a collision condition exists amongst the at least two solutions, said collision condition being a detected overlap of dependent ranges of the variable and a modification affecting range of the variable of the first solution and the second solution of said at least two solutions; and modifying the program with said at least two solutions if no collision condition exists, or disabling one of said first solution or said second solution if a collision condition is detected and modifying the target program with a remaining one of said first or second solution.

17. The computer program product of claim 16 wherein said modifying the target program with said at least two solutions comprises a rewriting of a segment of a target program code, said processor is further configured to perform one or both of:

applying multiple rewritings in a single solution; and applying multiple rewritings in multiple regions of the target program.

18. The computer program product of claim 16, wherein multiple rewritings are included in a single solution, said processor is further configured to perform one or both of:

applying a rewriting to a result of a previous rewriting, and at each rewriting, specifying the result of the previous rewriting.

19. The computer program product of claim 16, wherein said processor is further configured to perform:

disassembling a solution into unit rewritings; and receiving a unit rewriting procedure of each solution for applying said solutions as a set of the unit rewritings, wherein, a solution is not directly applied to the target program.

20. The computer program product of claim 19, wherein the unit rewriting procedure comprises one or more selected from the group consisting of: copying code body or loop body, replacing one or more characters of lines of code, insertion of code, insert a line in the code, inserting a modified body after an original body, and deleting of one or more continuous characters, said processor being further configured to perform:

storing copied code into a buffer with a location information of the original code;

applying unit rewritings from a solution of the at least two solutions; and inserting the code in a buffer after a body of said original code.

21. The computer program product of claim 18, wherein multiple solutions are applied to the target program, said processor being further configured to perform:

identifying correct application regions of the second and later solutions to be applied; and applying the second solution and later solutions to an already rewritten program.

* * * * *